(No Model.)
E. BUTTERICK.
HEN'S NEST.
No. 404,073. Patented May 28, 1889.
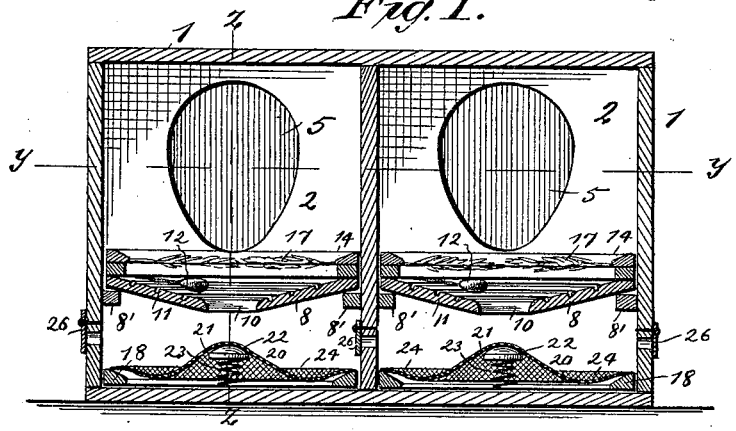
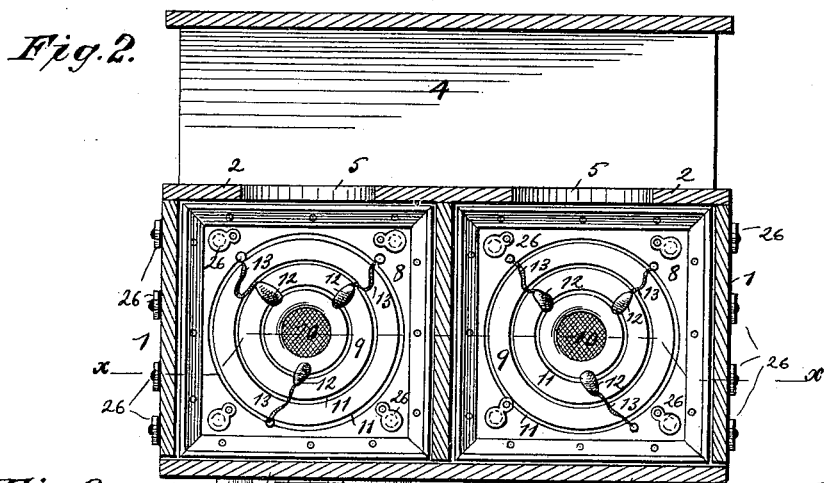
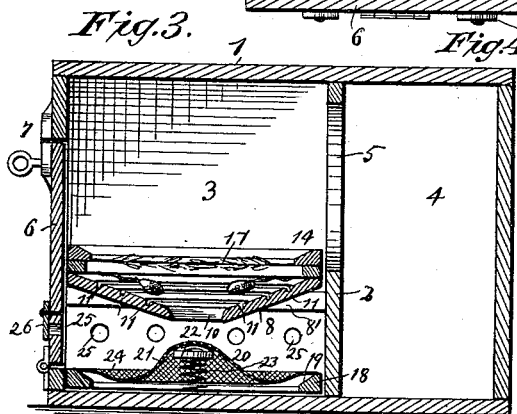
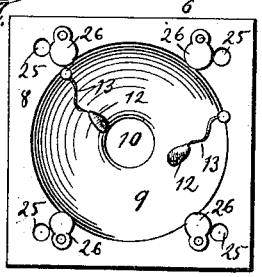
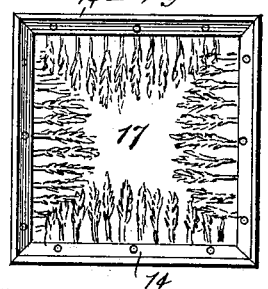
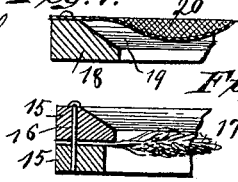
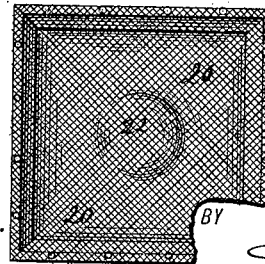
WITNESSES:
Phil C. Dieterich
C. Sedgwick
INVENTOR:
E. Butterick
BY Munn & Co
ATTORNEYS.
N. PETERS, Photo-Lithographer, Washington, D. C.

UNITED STATES PATENT OFFICE.

EBENEZER BUTTERICK, OF BROOKLYN, NEW YORK.

HEN'S NEST.

SPECIFICATION forming part of Letters Patent No. 404,073, dated May 28, 1889.

Application filed December 14, 1888. Serial No. 293,597. (No model.)

*To all whom it may concern:*

Be it known that I, EBENEZER BUTTERICK, of Brooklyn, in the county of Kings and State of New York, have invented a new and Improved Non-Incubating Hen's Nest, of which the following is a full, clear, and exact description.

This invention relates to hens' nests, and has for its object to provide a hen's nest by means of which a hen will be induced to lay eggs, and the eggs, as fast as they are laid, will safely pass to a receptacle below the nest, thereby avoiding incubation of the eggs.

The invention consists in a hen's nest for this purpose, and in details thereof constructed and arranged as hereinafter described and claimed.

Reference is to be had to the accompanying drawings, forming a part of this specification, in which similar figures of reference indicate corresponding parts in all the views.

Figure 1 is a vertical section of a pair of hen's nests constructed in accordance with this invention on the line $x\ x$, Fig. 2. Fig. 2 is a horizontal section thereof on the line $y\ y$, Fig. 1. Fig. 3 is a transverse vertical section on the line $z\ z$, Fig. 1. Figs. 4 and 5 are details in plan view of portions of the top of the nest detached. Fig. 6 is a detail in plan view of a portion of the receptacle below the nest, detached; and Figs. 7 and 8 are portions, partly in section and broken away, of the devices shown in Figs. 5 and 6.

In carrying out the invention a box or casing, 1, is employed, preferably formed with the partition 2, dividing the casing into the receptacle 3, in which the nest is located, and the covered passage-way 4, having open ends for the entrance of a hen. Access is had by the hen to the receptacle 3 from the passage 4 by means of an opening, 5, in the partition 2. The rear of the receptacle 3 is closed by a door, 6, secured by a suitable lock and key, 7.

The nest proper consists of a removable shelf, 8, located below the opening 5 and resting on cleats 8' on the sides of the receptacle. The shelf 8 is formed with a concave portion, 9, having a central opening, 10, and has its surface provided with a series of grooves, 11, or otherwise roughened, so as to prevent the hen slipping when taking her place on the shelf 8.

To the shelf 8 may be secured one or more nest-eggs, 12, preferably by means of cords 13, or other suitable connection, whereby the nest-eggs will be movable and thereby resemble real eggs, and also cannot be thrown out of the nest by the hen, as is apt to be the case. To give the appearance of a nest to the shelf 8, a portable frame, 14, is provided, which rests on the shelf 8, and consists of the strips 15, fastened together by pins 16, and having clamped between them hay or straw, 17, or other suitable material, which projects over the shelf 8, and presents the appearance of a nest.

Beneath the shelf 8 and located on the bottom of the receptacle 3 is a frame, 18, formed with inner beveled edges, 19, and having secured to its top the edges of a sheet, 20, of light, flexible fabric—such as gauze or linen—which extends loosely across the frame 18, so as to rest in loose folds on an elastic or yielding projection, 21, secured to the bottom of the receptacle 3 beneath the opening 10. As here shown, the yielding projection 21 preferably consists of an oval disk of cork, 22, mounted on a vertical spiral spring, 23. The loose sheet 20 rests on the projection 21 and hangs downward therefrom at an incline, so as to form a circular trough, 24, and then inclines upward over the beveled edges 19 of the frame 18. By this means when an egg is laid by a hen sitting on the shelf 8 the egg drops through the opening 10 and strikes against the projection 21, which, being elastic or yielding, obviates any danger of the egg cracking in striking it, and the egg then rolls down the incline on the sheet 20 into the circular trough 24 and upward on the opposite incline on the sheet 20 to the beveled edge 19, where it comes to a stop and rolls back into the trough 24. By this arrangement of the loosely laid sheet 20 the momentum of the egg is spent by the time it reaches the beveled edge 19 and the danger of its being broken by rolling against the side of the receptacle 3 is obviated. By having the passage-way 4 the receptacle 3 is darkened, thereby inducing a hen to seek the nest, as it is the habit of hens to seek dark places to lay eggs. Any number of receptacles 3, with nests constructed in accordance with this invention, may be arranged with a passage-way, 4, similarly to the two shown in Figs. 1 and 2. The light fabric 20, loosely arranged over the projection 21, serves also to keep the space beneath cool in summer, thereby avoiding the danger of eggs resting thereon from spoiling. To further aid in preserving the proper temperature for the eggs, ventilating-holes 25, with pivoted covers 26, are provided in the sides of the receptacle 3, in the door 6, and in the shelf 8. To prevent a hen in receptacle 3 from being disturbed, the door 6 is kept locked, access only being had to remove the eggs.

In winter the proper warmth may be had for the receptacle 3 by closing the holes 25 with the covers 26 and placing feathers beneath the shelf 8. By means of the removable shelf 8 and frames 14 and 18 the nest may be thoroughly cleaned and renovated.

With a nest constructed and arranged in accordance with this invention a hen will be induced to lay eggs and the eggs will be obtained intact.

Having thus described my invention, I claim as new and desire to secure by Letters Patent—

1. In a hen's nest, a concave shelf provided with an opening and an artificial nest-egg or nest-eggs loosely attached to the shelf by a connection, so as to permit the egg or eggs to rest and roll on the shelf, substantially as described.

2. In a hen's nest, a concave shelf with an opening, a frame with a sheet of light fabric loosely mounted thereon beneath the shelf, and a vertical yielding projection below the opening in the shelf and supporting the center of the sheet of light fabric, substantially as described.

3. In a hen's nest, a concave shelf provided with an opening and one or more artificial nest-eggs loosely attached thereto by a connection to rest and roll on the shelf, in combination with a frame having mounted thereon hay or other suitable nest-forming material projecting over the shelf, substantially as described.

4. In a hen's nest, a concave shelf having an opening and one or more artificial eggs loosely connected to the shelf, a frame located above the shelf and having mounted thereon hay or other suitable nest-forming material projecting over the shelf, a flexible sheet of light fabric loosely mounted beneath the shelf, and a vertical yielding projection below the opening in the shelf and supporting the center of the flexible sheet of light fabric, substantially as described.

5. In a hen's nest, the frame 14, consisting of strips 15, secured together by pins 16, and hay or straw, 17, clamped between the strips 15 and projecting inwardly in the frame 14, substantially as described.

6. In a hen's nest, the shelf 8, having the concave portion 9, with a roughened surface, the central opening, 10, the artificial nest-eggs 12, resting on shelf 8 and connected thereto by cords 13, and the ventilating-holes 25, with pivoted covers 26, substantially as described.

7. In a hen's nest, the frame 18, having the inwardly-beveled edges 19, and the light flexible fabric 20, loosely mounted on the frame 18, in combination with the spiral spring 23, having the oval top piece, 22, supporting the center of the flexible fabric 20, substantially as described.

8. A hen's nest consisting of a casing, 1, formed with the receptacle 3, having cleats 8' on its sides, a door, 6, ventilating-holes 25, with pivoted covers 26, located in the side of the receptacle 3 below the cleats 8' and in the lower part of the door 6, a covered passageway, 4, and a partition, 2, with opening 5, between the receptacle 3 and passage-way 4, in combination with a shelf, 8, resting on cleats 8' and having the concave portion 9, with roughened surface, the central opening, 10, the artificial nest-eggs 12, loosely connected by cords 13 to the top of shelf 8, and the ventilating-holes 25, with pivoted covers 26, a frame, 14, resting on shelf 8 and having hay or straw, 17, projecting over the latter, a frame, 18, with beveled edges 19, located in the bottom of the receptacle 3 beneath shelf 8, with a flexible fabric, 20, loosely connected thereto, and a spiral spring, 23, secured to bottom of receptacle 3 and having an oval top piece, 22, located below the opening 10 and supporting the fabric 20, substantially as described.

EBENEZER BUTTERICK.

Witnesses:
 EDWARD W. CODY,
 C. SEDGWICK.